(12) United States Patent
Marshall

(10) Patent No.: US 11,474,771 B1
(45) Date of Patent: Oct. 18, 2022

(54) SYSTEM AND METHOD FOR CROWDSOURCING AND DELIVERING MEDIA

(71) Applicant: Charlie Marshall, Burbank, CA (US)

(72) Inventor: Charlie Marshall, Burbank, CA (US)

( * ) Notice: Subject to any disclaimer, the term of this patent is extended or adjusted under 35 U.S.C. 154(b) by 0 days.

(21) Appl. No.: 17/559,232

(22) Filed: Dec. 22, 2021

Related U.S. Application Data

(60) Provisional application No. 63/128,690, filed on Dec. 21, 2020.

(51) Int. Cl.
*G06F 17/00* (2019.01)
*H04N 21/258* (2011.01)
*G07C 13/00* (2006.01)
*G06F 3/14* (2006.01)
*H04N 7/18* (2006.01)

(52) U.S. Cl.
CPC .......... *G06F 3/1446* (2013.01); *H04N 7/181* (2013.01)

(58) Field of Classification Search
None
See application file for complete search history.

(56) References Cited

U.S. PATENT DOCUMENTS

2017/0337761 A1\* 11/2017 Dunnington ........... G07C 13/00

\* cited by examiner

*Primary Examiner* — Carl Adams
(74) *Attorney, Agent, or Firm* — Barry Choobin; Patent 360

(57) ABSTRACT

A system and method for crowdsourcing to generate religious media and presenting the religious media digitally. A religious scripture can be split into chapters, verses, and the like parts. A set of parts of the religious scripture can be presented to users for selecting a part that has to composed. Thereafter, a selected artist can compose the selected part of the religious scripture. Also, disclosed is a user interface that allows the users to interactively enjoy the religious media on their electronic devices.

6 Claims, 2 Drawing Sheets

SYSTEM AND METHOD FOR CROWDSOURCING AND DELIVERING MEDIA

CROSS-REFERENCE TO RELATED APPLICATIONS

This application claims priority from the U.S. provisional patent application Ser. No. 63/128,690 filed on Dec. 21, 2020, which is incorporated herein by reference in its entirety.

FIELD OF INVENTION

The present invention relates to a system and method for delivering religious media, and more particularly, the present invention relates to a system and method of crowdsourcing for generating media and delivering the media.

BACKGROUND

Technology has revolutionized the ways in which media can be delivered to a common man. Media in the form of text, audio, and video can be delivered directly to the computer devices of users through the internet anytime and anyplace where the internet is accessible. Holy scriptures such as Bible have also been digitalized and available as both digital textbooks and audiobooks. A range of mobile applications is available for reading the bible on a smartphone. However, most of the known application delivering religious texts are generic in nature that follows the same theme and format. The known applications typically provide the text in indexed and hyperlinked format. Also, are known the applications that incorporate text to speech engine to read the text for the user. Thus, the known applications fail to grab enough attention from the users and keep them engaged. Moreover, the known applications fail to emotionally connect with the users or spiritually excite them.

There currently exists a need for generating religious media that is liked by a lot of people.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system and method for crowdsourcing to generate religious media.

It is another object of the present invention that system and method deliver media that is liked by many.

It is still another object of the present invention that the media can spiritually and emotionally excite the users.

It is a further object of the present invention that the disclosed system and method makes the process of generating the media economical.

In one aspect, disclosed is a system and method, for crowdsourcing to generate religious media, the method implemented within the system comprising a processor and a memory, the method comprising the steps of splitting, by a media module implemented within the system and upon execution by the processor, a religious scripture into a plurality of blocks; presenting, by a crowdsourcing module implemented within the system and upon execution by the processor, a set of blocks from the plurality of blocks, through an interface on a plurality of participating external devices; receiving, by the crowdsourcing module, a plurality of first choices from the plurality of participating external devices, wherein the plurality of first choices relates to selection of blocks from the set of blocks; determining, by the crowdsourcing module, a selected block from the set of blocks based on the plurality of first choices; associating, by the crowdsourcing module, a plurality of artists to the selected block; and receiving, by the crowdsourcing module, a plurality of second choices from the plurality of participating external devices, wherein the plurality of second choices relates to selections of artists from the plurality of artists. The plurality of blocks comprises chapters and verses of the religious scriptures.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
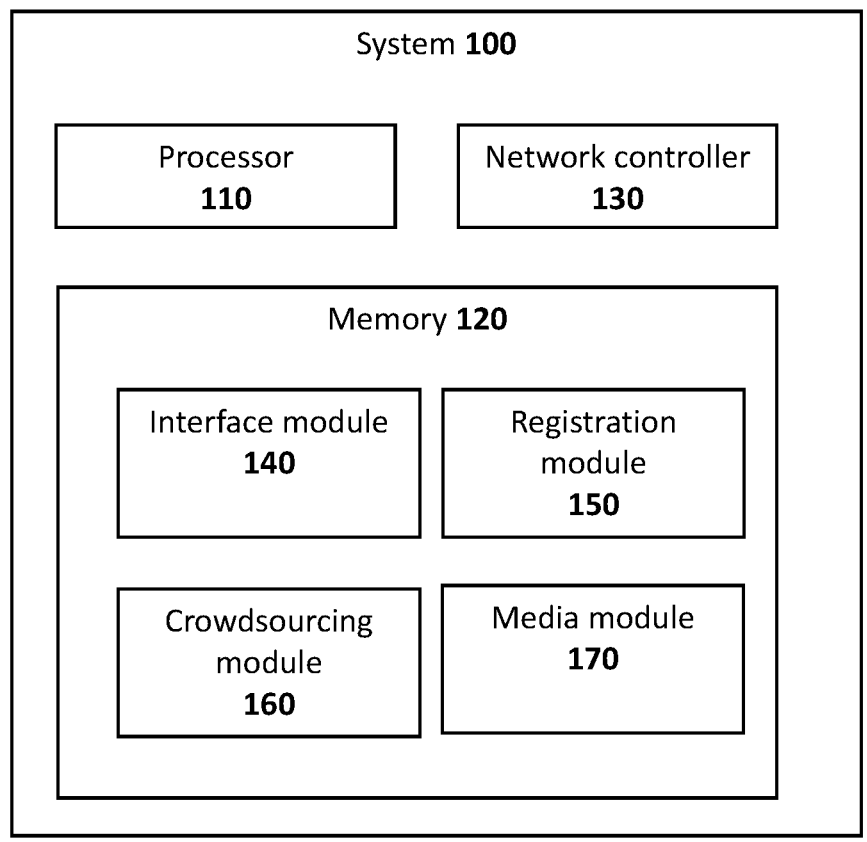
FIG. 1 is a block diagram of the disclosed system, according to an exemplary embodiment of the present invention.

Disclosed are a system and method for crowdsourcing to generate religious media and delivery of the religious media. Referring to FIG. 1 which discloses an exemplary embodiment of the disclosed system 100. The system 100 can include a processor 110 coupled to a memory 120 and a network controller 130 through a system bus (not shown). The network controller 130 can allow the disclosed system 100 to connect to an external network. The external network can be a wired, a wireless network, or a combination of the wired network and wireless network. The wired network may include DSL and optical fiber lines. The wireless network may include Bluetooth®, Wi-Fi, WiMAX, and cellular networks including GPRS, LTE, CDMA, 3G, 4G, and 5G. The external network can be a secure network or an unsecured network. The disclosed system can connect to different external devices through the network for receiving information from the external devices and transmitting the information to the external devices. The external device can be a computer, a laptop, a tablet, a smartphone, and the like. The processor 110 can be any logic circuitry that responds to, and processes instructions fetched from the memory 120. Suitable examples of the processors commercially available include Intel and AMD. The processor can read instructions from a machine-readable or computer-readable medium (e.g., a non-transitory machine-readable storage medium) and perform any one or more of the methodologies discussed herein. The memory 120 may include one or more memory chips capable of storing data and allowing any storage location to be directly accessed by the processor 110.

The memory can include modules which upon execution by the processor can perform any one or more of the methodologies discussed herein. The module can be a set of instructions including software, a program, an application, or other executable code for causing the processor to perform any one or more of the methodologies discussed herein. The interface module 140 upon execution by the process can provide a user interface that may allow users to interact with the disclosed system 100. The interface can be implemented on the external devices of the user. The interface can be implemented on the external device as application software that can be installed on the external devices. The application software can be developed for Android™, iOS, and any other known operating platform for mobile devices. The application software can be made available through a distribution service provider, for example, Google Play™ operated and developed by Google, and the app store by Apple. In addition to the application software, a website-based interface can also be provided through the world-wide-web. The application software can also be provided for the desktop environment, such as Windows™, Linux, and macOS. The user interface may permit interacting with a user through the external device, wherein information can be presented through the user interface by the system 100 on the external devices and information can be received by the system 100 from the external devices. Moreover, the user interface may allow the users to upload documents, photographs, and like through external devices. Also, the interface module can provide an admin interface implemented within the system and allows for configuring the system 100. The memory 120 may also include a registration module 150 which upon execution by the processor can provide for receiving and recording information related to the users who become members of the disclosed system 100. The crowdsourcing module 160 upon execution by the processor can receive choices of the users. The media module 170 upon execution by the processor can manage the religious media including the generation of the religious media.

In one aspect, the disclosed crowdsourcing module 160 can provide for crowdsourcing different artists including Christian, gospel, country, and independent music recording artists for generating the narrations. The phrase "independent music recording artist" means any artist, performer, social media personality, or media influence personality with a minimum of one to four hundred ninety-nine thousand audio/audio streams, videos, viewers, or followers on all forms of distribution sources. The disclosed media module can break a scripture, also referred to herein as a subject matter, into blocks. The blocks can be separate chapters and verses, wherein content in a block can be inherently related. Each block can be tagged with metadata that allows rearranging the scattered blocks back to the scripture. The crowdsourcing module can allow selecting narrators from many that can process the blocks, wherein each selected narrator can process one or more blocks, and the different blocks can be processed by different selected narrators. The processing of a module can include recording the chapters and verses of the scripture. Each chapter can be accompanied by specific original songs/compositions that relate to each chapter and verse.

In one implementation of the disclosed system and method, the media module can also incorporate a speech-to-text software that can display text as the audio file plays. The interface module can present the text on the external devices for the user to read while listening to the audio files. The interface can also provide options to turn on and off the audio narrations, music, and text as and when desired. The interface module may also allow the users to select a language of their choice for the narrations and the text. The text and narrations can be stored by the media module in different languages. Alternatively, the media module may allow for on-the-fly translations of the narrations and the text to the chosen language. The interface module can allow the users to "pause", "rewind", "fast-forward", and/or return at their leisure to continue listening. The interface can allow the users to save favorites for a personalized experience. Moreover, the users can select one verse as narrated by the narrator or they can elect to listen to the entire chapter without interruption (i.e., "continuous play mode"). Each "continuous play mode" can be accompanied by original background mood music.

Figure 2:
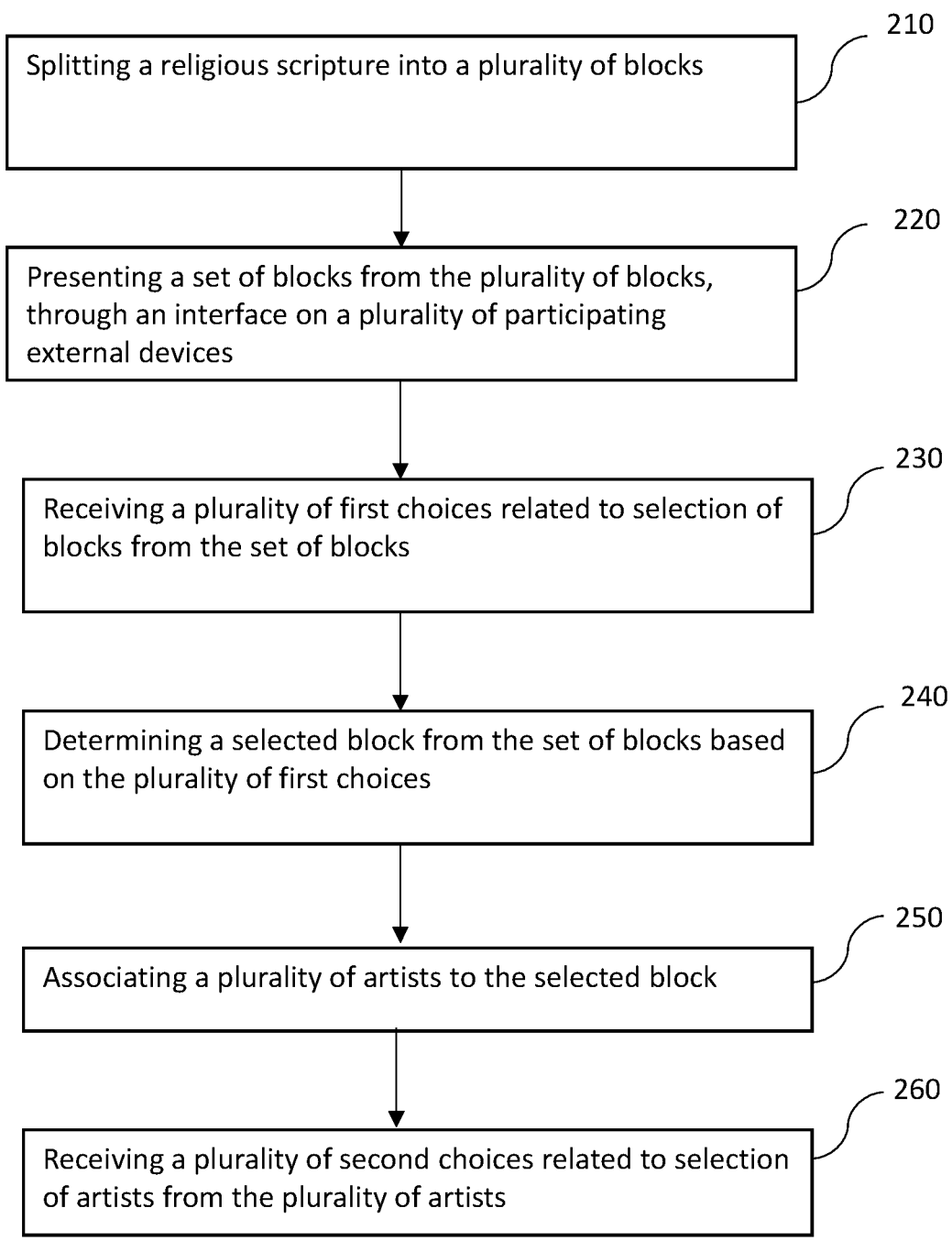
FIG. 2 is a flowchart showing steps of the disclosed method of crowdsourcing for generating media, according to an exemplary embodiment of the present invention.

Referring to FIG. 2 which illustrates the steps performed by the crowdsourcing module. The disclosed crowdsourcing module can present a predetermined number of blocks to participating users through the user interface implemented by the interface module on the external devices. For example, the blocks can be new musical compositions. The crowdsourcing module can then receive a choice of a block from the participating users. The choice of the block can be a block selected by a user from the five blocks. The participating users can vote on their favorite composition. Based on the choices received from the participating user, the crowdsourcing module can select a block from the five blocks having a maximum number of votes. Once the block is selected, the crowdsourcing module can then associate a list of artists or narrators to the selected block. Thereafter, the crowdsourcing module can receive a choice of artists from the participating users. The participating users can choose the artist(s) that they would like to record the selected composition. The crowdsourcing module can determine an artist from the list of artists that received maximum votes, and the selected artist can be associated with the selected block for processing the block. The media module can receive the processed block and index the same based on the metadata in the disclosed system.

First, a religious scripture, such as a Bible can be split, by the media module into a plurality of blocks, at step 210. The block can be parts of the religious scripture, such as the chapters and verses. A block can be such a part that can be independently composed and presented. A set of blocks from the plurality of blocks can then be presented, by a crowdsourcing module, through an interface on a plurality of participating external devices, at step 220. The crowdsourcing module can then receive a plurality of first choices from the plurality of participating external devices, at step 230, wherein the plurality of first choices relates to the selection of blocks from the set of blocks. The user through their devices can vote or present their choice of a block from the blocks. Once, all the choices can be received, the crowdsourcing module can determine a selected block from the set of blocks based on the plurality of first choices, at step 240. the crowdsourcing module can then associate a plurality of artists to the selected block, at step 250. The crowdsourcing module can then receive a plurality of second choices from the plurality of participating external devices, wherein the plurality of second choices relates to selections of artists from the plurality of artists, at step 260.

In certain implementations, the crowdsourcing module can provide an opportunity for all participating users to review original musical compositions and pick favorite songs by voting. The song with the greatest number of votes can be deemed the "contest winner". The participating users can then select an artist, through the interface, to record the winning song. The artist with the greatest number of votes wins.

In one aspect, the disclosed crowdsourcing module can receive from each visitor a predetermined amount of money, such as 99 cents to cover studio cost, legal expenses, artwork for a new song, distribution, etc., thus making the participating users co-producers. Once the song is completed work, each "co-producer" can be notified by the media module to download the song, through the interface. The media module may receive 99 cents for each download from non-participating users. The media module can also provide for generating a short excerpt from the finished song, wherein the non-co-producers can listen to a short excerpt of the song before deciding to pay and download the whole song.

In certain implementations, the voice synthesis technology can also be incorporated without departing from the scope of the present invention. The system can allow the reproduction of recording artists' voices narrating bible chapters and verses.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for crowdsourcing to generate religious media, the method implemented within a system comprising a processor and a memory, the method comprising the steps of:
    splitting, by a media module implemented within the system and upon execution by the processor, a religious scripture into a plurality of blocks;
    presenting, by a crowdsourcing module implemented within the system and upon execution by the processor, a set of blocks from the plurality of blocks, through an interface on a plurality of participating external devices;
    receiving, by the crowdsourcing module, a plurality of first choices from the plurality of participating external devices, wherein the plurality of first choices relates to selection of blocks from the set of blocks;
    determining, by the crowdsourcing module, a selected block from the set of blocks based on the plurality of first choices;
    associating, by the crowdsourcing module, a plurality of artists to the selected block; and
    receiving, by the crowdsourcing module, a plurality of second choices from the plurality of participating external devices, wherein the plurality of second choices relates to selections of artists from the plurality of artists.

2. The method according to claim 1, wherein the plurality of blocks comprises chapters and verses of the religious scriptures.

3. The method according to claim 2, wherein the method further comprises the steps of:
    determining an artist based on the selections of artists and the plurality of second choices;
    upon determining the artist, processing the selected block; and
    presenting, by the media module, the processed block.

4. A system for crowdsourcing to generate religious media, the system comprising a processor and a memory, wherein the system is configured to implement a method comprising the steps of:
    splitting, by a media module implemented within the system and upon execution by the processor, a religious scripture into a plurality of blocks;
    presenting, by a crowdsourcing module implemented within the system and upon execution by the processor, a set of blocks from the plurality of blocks, through an interface on a plurality of participating external devices;
    receiving, by the crowdsourcing module, a plurality of first choices from the plurality of participating external devices, wherein the plurality of first choices relates to selection of blocks from the set of blocks;
    determining, by the crowdsourcing module, a selected block from the set of blocks based on the plurality of first choices;
    associating, by the crowdsourcing module, a plurality of artists to the selected block; and
    receiving, by the crowdsourcing module, a plurality of second choices from the plurality of participating external devices, wherein the plurality of second choices relates to selections of artists from the plurality of artists.

5. The system according to claim 4, wherein the plurality of blocks comprises chapters and verses of the religious scriptures.

6. The system according to claim 5, wherein the method further comprises the steps of:
- determining an artist based on the selections of artists and the plurality of second choices;
- upon determining the artist, processing the selected block; and
- presenting, by the media module, the processed block.

* * * * *